US006263389B1

(12) United States Patent
LaBerge

(10) Patent No.: US 6,263,389 B1
(45) Date of Patent: *Jul. 17, 2001

(54) APPARATUS FOR INCREASING THE NUMBER OF LOADS SUPPORTED BY A HOST BUS

(75) Inventor: Paul A. LaBerge, Shoreview, MN (US)

(73) Assignee: Micron Technology, Inc., Boise, ID (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/009,915

(22) Filed: Jan. 21, 1998

(51) Int. Cl.$^7$ ....................................................... G06F 13/38
(52) U.S. Cl. ............................................................. 710/128
(58) Field of Search .................................... 710/129, 128, 710/126, 122; 713/400, 401, 500, 501, 600

(56) References Cited

U.S. PATENT DOCUMENTS

| 5,485,458 | 1/1996 | Oprescu et al. ............... 370/85.2 |
|---|---|---|
| 5,550,990 | 8/1996 | Keener et al. ................. 395/309 |
| 5,734,850 | 3/1998 | Kenny et al. .................. 395/309 |
| 5,774,684 | 6/1998 | Haines et al. ................. 395/309 |
| 5,802,327 | 9/1998 | Hawley et al. ................ 395/281 |
| 5,857,082 | 1/1999 | Murdoch et al. .............. 395/308 |
| 5,918,026 | * 6/1999 | Melo et al. ..................... 710/128 |
| 6,041,380 | * 3/2000 | LaBerge ......................... 710/129 |

\* cited by examiner

Primary Examiner—Robert Beausoleil
Assistant Examiner—X. Chung-Trans
(74) Attorney, Agent, or Firm—Dorsey & Whitney LLP

(57) ABSTRACT

The present invention comprises a computer system having a host bus comprising a first bus following a protocol, a second bus following the protocol and linking logic operably connecting the first and second buses such that the host bus follows the protocol. The present invention may further comprise at least one system controller operably connected to the second bus and at least one peripheral device operably connected to the system controller, wherein the early snoop signal is asserted by the system controller.

23 Claims, 4 Drawing Sheets

APPARATUS FOR INCREASING THE NUMBER OF LOADS SUPPORTED BY A HOST BUS

This application is related to, and incorporates by reference, an application titled "A Method for Operating a Host Bus" filed on even date herewith, Ser. No. 09/010,084, now U.S. Pat. No. 6,041,380.

1. FIELD OF THE INVENTION

The present invention relates to computer systems. More particularly, the present invention relates to apparatus and methods for increasing the loads supportable on the host bus of a computer system.

2. BACKGROUND OF THE INVENTION

In many computer systems, there are limits to the number of bus agents that may be operably connected to the host bus if the host bus is to be clocked at a certain frequency. These limits result from the capacitance and distributed resistance physically present on chips. For example, as shown in the example prior art system of FIG. 4, in Pentium® Pro based computer systems, the host or P6 bus is limited to 4 Pentium® Pro processors and 1 bus bridge or system controller if the P6 bus is to be clocked at 100 MHz. If the P6 bus is operably connected to 4 processors and 4 system controllers, the clock rate of the P6 bus must be decreased to 66 MHz. Such a decrease in the P6 clock rate results in lower bus bandwidth and thus, a slower and relatively more inefficient computer system, having decreased system throughput. Alternatively, if added loads are desired for a computer system, these must be placed on a bus that is connected to the bus bridge, placing them a further level away from the processor. This leads to latency problems for these loads. While such problems are less of an issue in a single processor system, in systems that require multiple processors and have many attached network cards or other peripherals, the load limits represent significant obstacles or undesirable trade-offs.

Thus, there exists a need in the art for methods and apparatus for increasing the number of devices operably connected to a host bus when clocking the bus a certain frequency.

3. SUMMARY OF THE INVENTION

The present invention comprises a computer system having a host bus comprising a first bus following a protocol, a second bus following the protocol and linking logic operably connecting the first and second buses such that the host bus follows the protocol. The present invention may further comprise at least one system controller operably connected to the second bus and at least one peripheral device operably connected to the system controller, wherein the early snoop signal is asserted by the system controller.

4. BRIEF DESCRIPTION OF THE DRAWINGS

For a more complete understanding of the present invention, and the advantages thereof, reference is now made to the following description taken in conjunction with the accompanying drawings, in which.

5. DETAILED DESCRIPTION OF THE INVENTION

5.1 Description of an Embodiment

Figure 1:
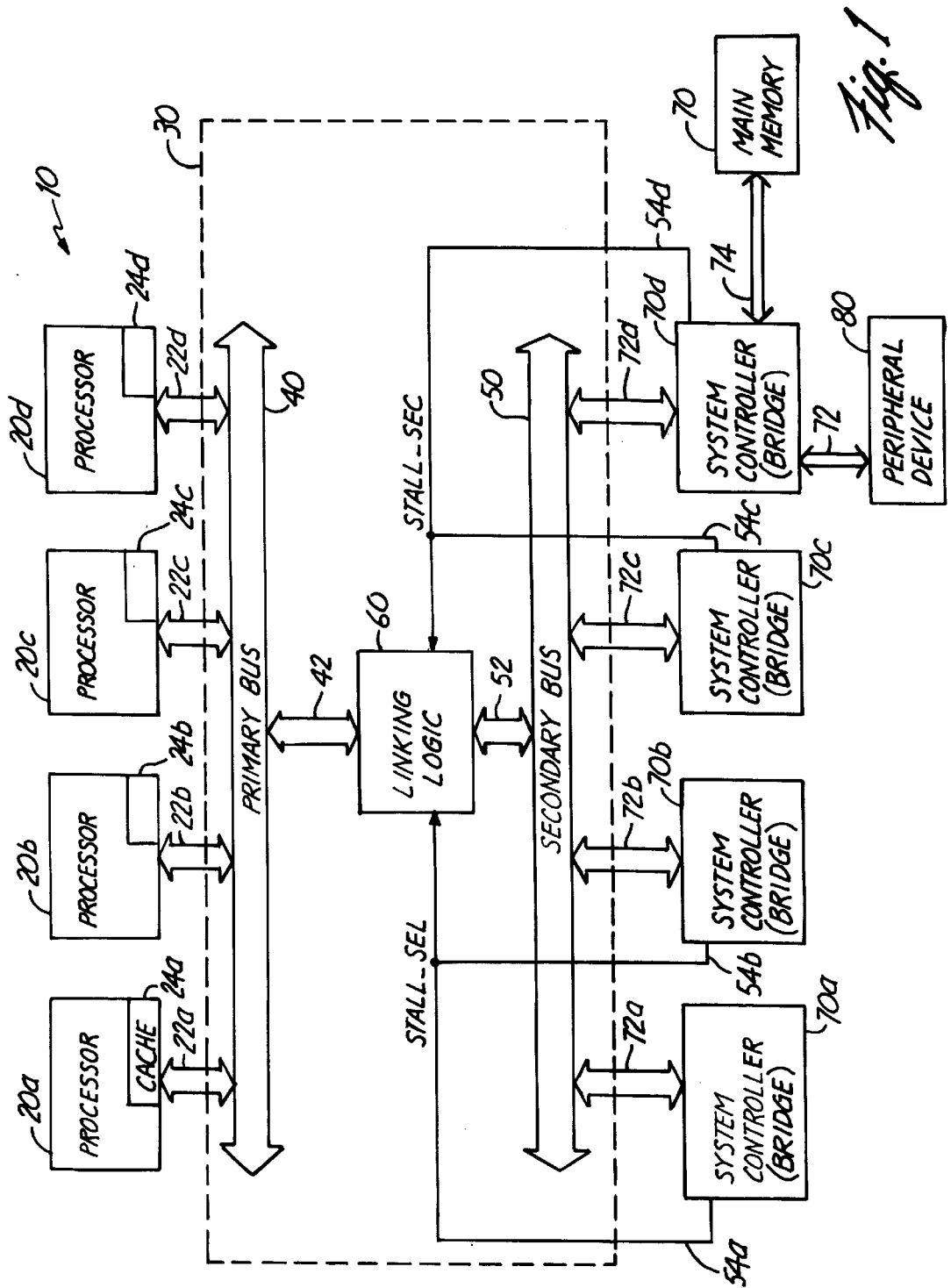
FIG. 1 is a block diagram of a computer system that uses the present invention.

In FIG. 1, there is shown a computer system 10 using the present invention. Generally, the computer system 10 may comprise a plurality of processors 20a–d, a plurality of system controllers 70a–d, and a host bus 30. A device issuing a transaction on the host bus 30 may be referred to as a requesting agent. A device to which a transaction is issued may be referred to as an addressed agent or a target agent. Devices operably connected to the host bus 30 may be referred to as bus agents.

5.1.1 Processor

FIG. 1 illustrates a multi-processor computer system, although the present invention may also be beneficial in single processor computer systems with many loads. Each processor 20a–d may be any conventional general purpose single- or multi-chip processor such as a Pentium® Pro class of processor, a 8051 processor, a MIPS® processor, a Power PC® processor, or an ALPHA® processor. Hereinafter, a Pentium® Pro class of processor refers to, among others, Pentium® Pro processors, Pentium® II processors, and any other type of processor having a Pentium® Pro type of architecture or following a Pentium® Pro type of protocol. The following detailed description may describe the present invention in terms of a Pentium® Pro processor. However, as noted above, the invention is not so limited, and such a description is but one embodiment of the present invention.

In addition, each processor 20a–d may be any conventional special purpose processor such as a digital signal processor or a graphics processor. Each processor 20a–d may have an integrated level one (L1) cache and may also have an integrated level two (L2) cache (the integrated L1/L2 caches are shown collectively as 24a–d). As shown in FIG. 1, each processor 20a–d may be operably connected to a host bus 30 by one of bidirectional buses 22a–d respectively.

5.1.2 System Controller, Peripheral Devices and Main Memory

In FIG. 1, each system controller 70a–d may be operably connected to a plurality of various peripheral devices 80 (such as PCI-based devices or 3-D graphics controllers) by a peripheral device bus 72 and/or may be operably connected to main memory 90 by a memory bus 74. (For clarity, only system controller 70d is shown operably connected to such elements). The system controllers 70a–d may control transactions between the processors 20a–d and the peripheral devices 80 and/or main memory 90.

5.1.3 Host Bus

Transactions between the processors 20a–d and the peripheral devices 80 or main memory 90 may be issued on the host bus 30. The host bus 30 may operate logically with a host bus protocol according to the type of processor 20a–d in the computer system 10.

In one embodiment, the host bus 30 may be a Pentium® Pro processor bus 30 following a Pentium® Pro processor bus protocol. Moreover, in this embodiment, the Pentium® Pro processor bus 30 may be clocked at 100 Mhz while operably connected to (or loaded with) 4 Pentium® Pro processors 20a–d and 4 system controllers 70a–d.

The host bus 30 is logically a single bus but physically the host bus 30 is "split" and may comprise a primary bus 40, a secondary bus 50 and linking logic 60. The linking logic 60 operably connects the primary bus 40 and secondary bus 50, permitting them to work together as one logical host bus 30.

5.1.3.1 Primary Bus

The primary bus 40 may be a physically discrete bus. The primary bus 40 may be operably connected to the processors 20a–d via bidirectional buses 22a–d respectively. The primary bus 40 may also be operably connected to the linking logic 60.

In one embodiment, the primary bus 40 may be a Pentium® Pro processor bus (following a Pentium® Pro processor bus protocol) operably connected to 4 Pentium® Pro processors and the linking logic 60. In this embodiment, the primary bus 40 may be clocked at 100 MHz.

5.1.3.2 Secondary Bus

The secondary bus 50 also may be a physically discrete bus. The secondary bus 50 may be operably connected to the system controllers 70a–d via bidirectional buses 72a–d respectively. The secondary bus 50 may also be operably connected to the linking logic 60.

In one embodiment, the secondary bus 50 may be a Pentium® Pro processor bus (following a Pentium® Pro processor bus protocol) operably connected to 4 system controllers 70a–d and the linking logic 60. In this embodiment, the secondary bus 50 may be clocked at 100 MHz.

5.1.3.3 Linking Logic

Figure 2:
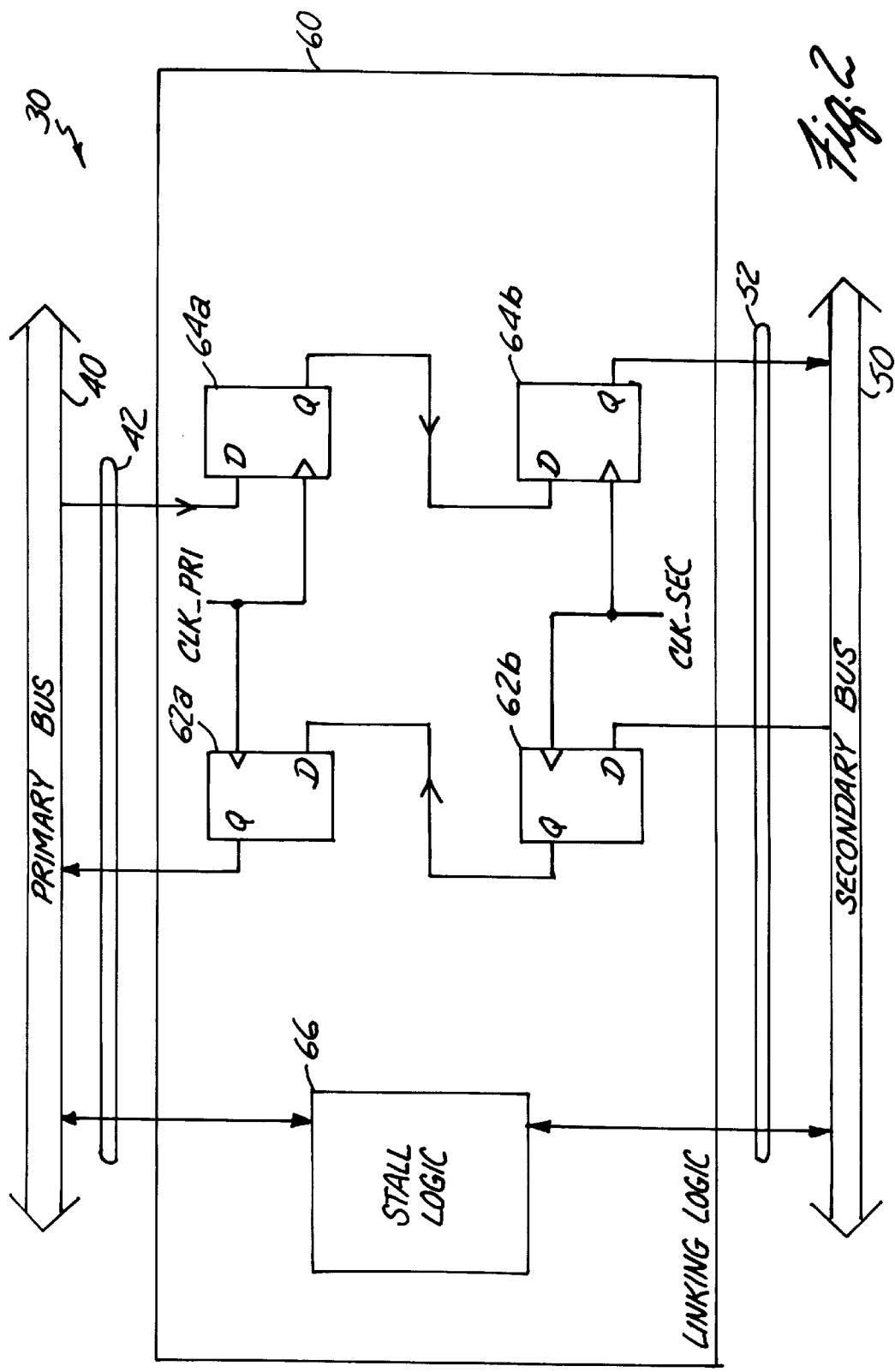
FIG. 2 is a block diagram of the linking logic illustrated in FIG. 1.

The linking logic 60 is illustrated in more detail in FIG. 2. The linking logic is operably connected to the primary bus 40 by a bidirectional bus 42 and to the secondary bus 50 by a bidirectional bus 52. The linking logic 60 operably connects the primary bus 40 and the secondary bus 50 such that the host bus 30, although comprised of two physically discrete (i.e., distinct) buses, operates logically as a single host bus 30 following a host bus protocol. The linking logic 60 may be an application specific integrated circuit (ASIC).

The linking logic 60 may comprise a first pair of flip flops 64a–b, a second pair of flip flops 62a–b and stall logic 66. The flip flops may be D type flip flops. Flip flop 64a receives signals from the primary bus 40 on bidirectional bus 42 and clocks the signals into the linking logic 60 with the primary bus clock CLK_PRI. Flip flop 64b receives signals clocked into the linking logic 60 from flip flop 64a and clocks the signals out of the linking logic 60 with the secondary bus clock CLK_SEC. Flip flop 64b provides these signals to the secondary bus 50 on bidirectional bus 52. In essence, the flip flop pair 64a–b clocks signals from the primary bus 40 (clocked in the primary bus clock domain) to the secondary bus 50 (clocked in the secondary bus clock domain).

The flip flop pair 62a–b operates in a similar manner. The flip flop pair 62a–b clocks signals from the secondary bus 50 (clocked in the secondary bus clock domain) to the primary bus 40 (clocked in the primary bus clock domain).

The stall logic 66 may transmit and receive signals to and from the primary bus 40 on bidirectional bus 42. Similarly, the stall logic 66 may transmit and receive signals to and from the secondary bus 50 on bidirectional bus 52. For example, in one embodiment, the primary bus 40 and secondary bus 50 may each be Pentium® Pro processor buses (operating logically as a single Pentium® Pro processor host bus 30). In this embodiment, the stall logic 66 may (1) receive an address strobe ADS_PRI# from the primary bus 40, (2) transmit a hit signal HIT_PRI# and hit modified signal HITM_PRI# to the primary bus 40 (see FIG. 3b), and (3) receive a STALL_SEC# signal from the secondary bus 50. The STALL_SEC# signal may be a sideband signal on the Pentium® Pro processor buses; i.e., a signal that is not part of the standard Pentium® Pro processor bus protocol, but is defined and has meaning for the stall logic 66 and other components within the computer system 10.

5.2 Method of Operation

The operation of the computer system 10 comprising the present invention will now be described. In the computer system 10, transactions between bus agents are performed over the host bus 30. For example, processor 20a may issue a read request to peripheral device 80 over the host bus 30 (i.e., over the two physically distinct buses 40 and 50 and the linking logic 60 comprising the host bus 30).

A communication transaction over the host bus 30 may comprise a set of host bus phases. Each host bus phase employs a predetermined set of signals for communicating transactions over the host bus 30. The host bus 30 may have a pipelined architecture in which the bus phases of different transactions may overlap. Thus, the host bus 30 may be capable of supporting a plurality of transactions at the same time.

As noted in the Pentium® Pro embodiment described above, the host bus 30 may be a Pentium® Pro processor bus (i.e., two physically distinct Pentium® Pro processor buses 40 and 50) that may have, among other phases, a request phase, a snoop phase, a response phase and a data phase. In the Pentium® Pro embodiment, the host bus 30 may be capable of supporting eight pipelined transactions at one time. A detailed description of the Pentium® Pro processors and the Pentium® Pro processor bus protocol, transactions and signals may be found in the Pentium® Pro Family Developer's Manual, Volume 1: Specifications (1996), which is incorporated herein by reference. The various phases are performed by the host bus 30 in accordance with the standard bus protocol, a description of which follows. However, as further described with reference to FIGS. 3a and 3b, the linking logic 60 performs certain internal operations that are logically transparent to the bus agents and permit additional loads on host bus 30.

In the request phase, a requesting agent, such as the processor 20a, may transfer a transaction request and address information onto the host bus 30. In the Pentium® Pro embodiment, the request phase is two clock cycles in duration. During the first clock cycle of the request phase of the Pentium® Pro embodiment, the requesting agent asserts an address strobe signal ADS# onto the host bus 30 and transfers a request address and request information onto the host bus 30. The requested address may be, for example, within the peripheral device 80. The request address and request information enable the bus agents operably connected to the host bus 30 to perform snooping operations and memory access operations. During the second clock cycle of the request phase, the requesting agent may transfer additional transaction information to the host bus 30. According to the Pentium Pro bus protocol, there must be one clock cycle between request phases; i.e., there must be 3 clock cycles between assertions of ADS#.

The snoop phase will follow the request phase. During the snoop phase, the bus agents operably connected to the host bus 30 provide snoop results that correspond to the requested address in the request phase. The snoop results provided by the bus agents indicate whether the requested address references a valid or modified cache line in the internal cache of a particular bus agent. The snoop results also indicate whether the transaction will be completed in the order the transaction was transferred to the host bus 30, or whether the transaction will be deferred and retried during a later clock cycle. If a bus agent is unable to determine the status of its internal cache or if a bus agent is unable to determine whether a transaction will be completed in order or deferred and retried later (i.e., unable to provide valid snoop results), that bus agent must stall the snoop phase. In this case, the snoop results may be provided to the host bus 30 by the bus agent during a subsequent clock cycle. A snoop phase may be repeatedly stalled by a particular bus agent until the bus agent is able to provide valid snoop results.

In the Pentium® Pro embodiment, the snoop results are driven by the bus agents 4 clock cycles after the assertion of the address strobe ADS# (i.e., 4 clock cycles after the beginning of the request phase). Alternatively, 4 clock cycles after the assertion of the address strobe ADS#, a bus agent must stall the snoop phase by asserting both the HIT# and HITM# signals (the "stall signals"). Unless stalled, a snoop phase is 2 clock cycles in duration. If a snoop phase is stalled by a bus agent, the bus agents will drive their snoop results 6 clock cycles after the assertion of the address strobe ADS#. If a snoop phase is further stalled, the bus agents will drive their snoop results 8 clock cycles after the assertion of the address strobe ADS#, and so on with additional delays of 2 clock cycles as needed. In the pipelined architecture of the Pentium® Pro processor bus, if transaction 1 is stalled, the snoop phase of the subsequent transactions (e.g., transaction 2, transaction 3, etc.) will not begin until after valid snoop results for transaction 1 are provided to the host bus 30.

During the response phase, the target agent indicates whether the transaction has succeeded, been deferred, been retried or failed. During the response phase, the target agent may also indicate whether the transaction will contain a data phase. In the Pentium® Pro embodiment, the response phase begins two clock cycles after the beginning of the first snoop phase that is not stalled. The response phase is two clock cycles in duration.

The data phase coincides with the response phase and may extend beyond the response phase. For a write transaction, a requesting agent may transfer write data over the host bus 30. Because data is being transferred by the requesting agent, the data phase for a write transaction may begin before the target agent begins the response phase. For a read transaction, the requesting agent may receive read data from the target agent over the host bus 30. Because data is being transferred by the target agent, the data phase begins in the same clock period as the response phase.

In the Pentium Pro embodiment, the data phase for a read transaction begins with the assertion of the data bus busy signal DBSY#. The DBSY# signal may remain asserted for a maximum of 3 clock cycles. At least 1 clock cycle must separate the data phases of two different transactions.

Figure 3:
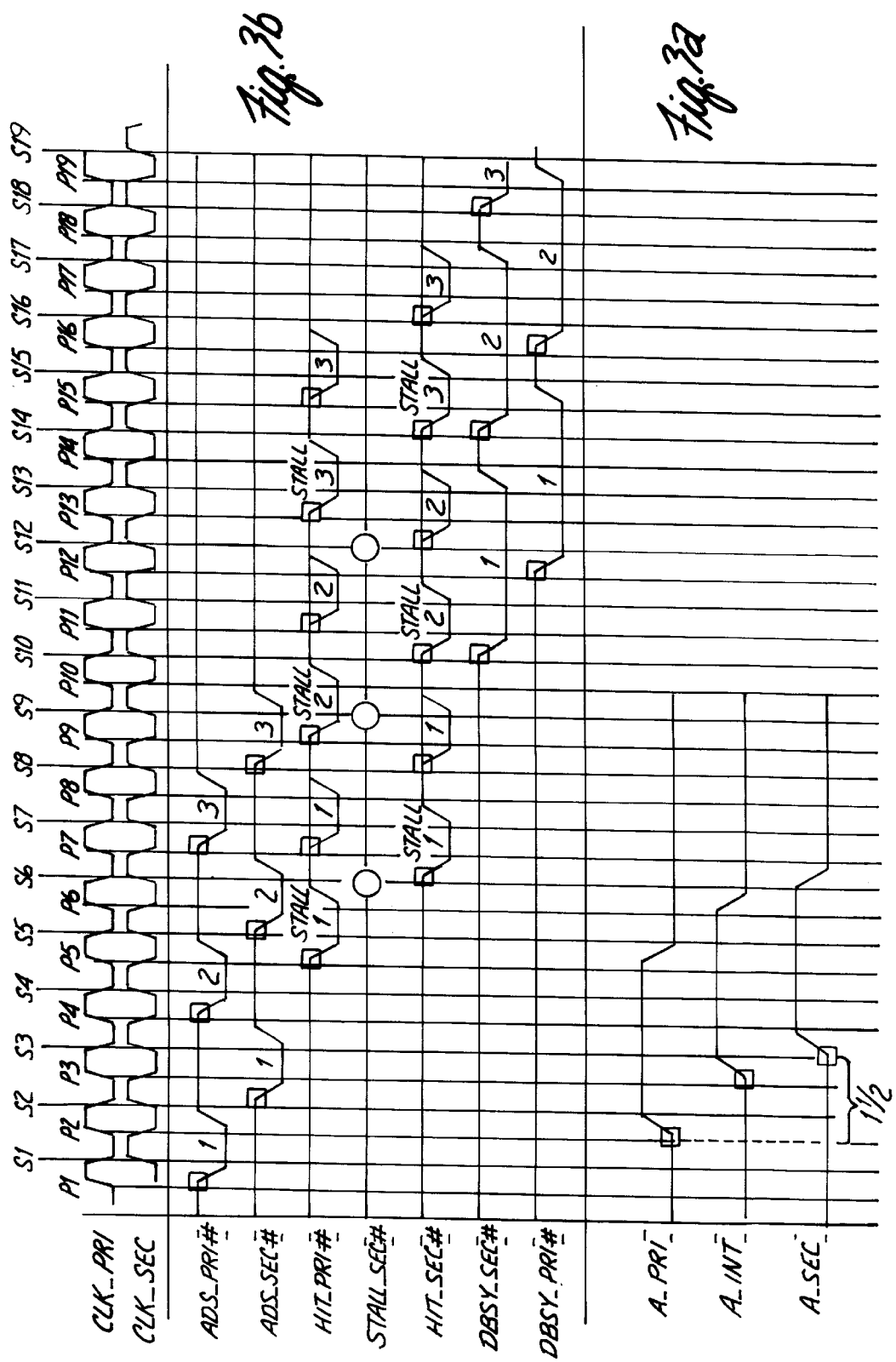
FIG. 3a is a timing diagram illustrating operation of the present invention.
FIG. 3b is a timing diagram illustrating operation of the present invention.
Figure 4:
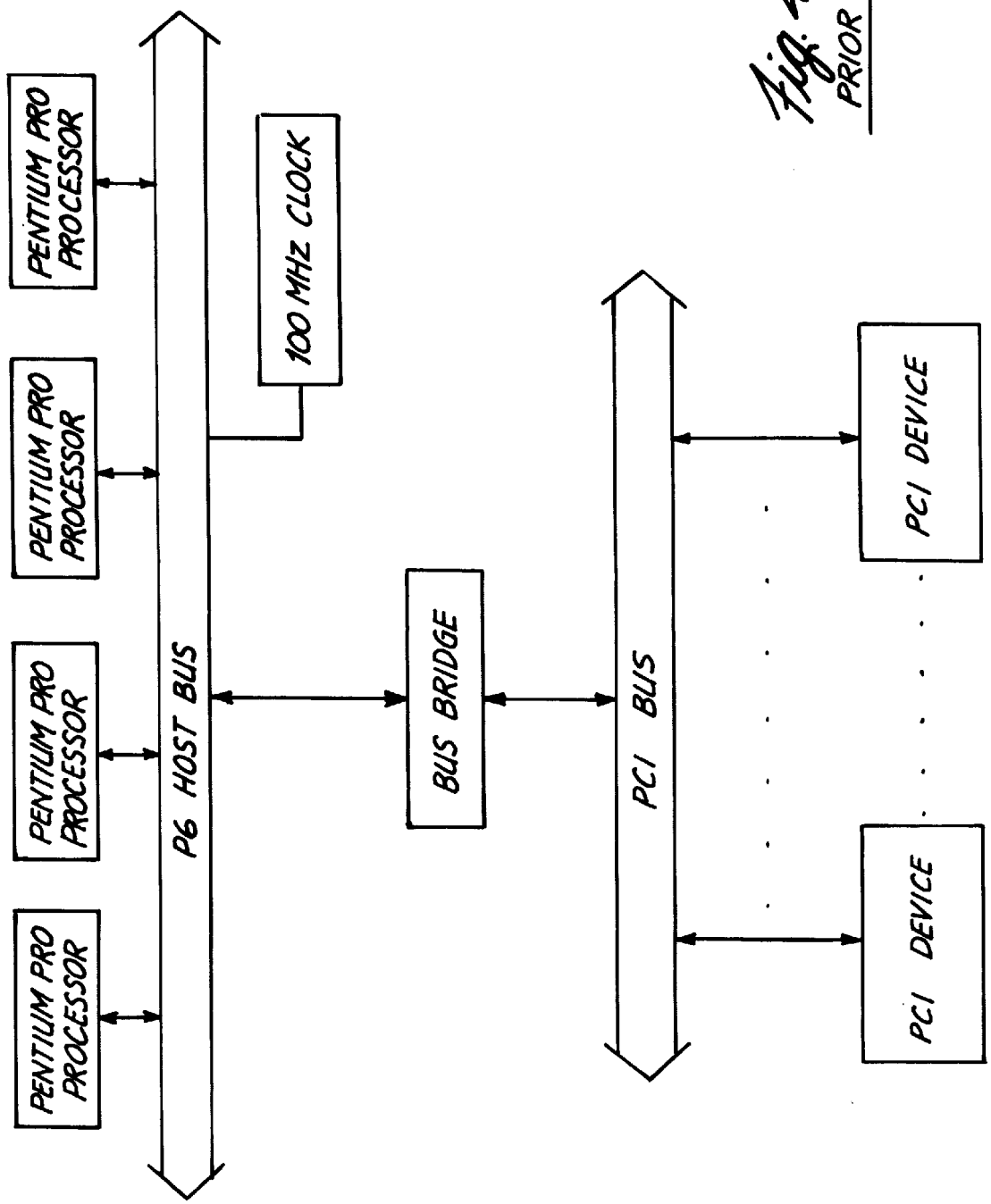
FIG. 4 is a block diagram of a prior art computer system.

Referring now to FIGS. 3a–b, the operation of the split host bus 30 and linking logic 60 to implement the Pentium Pro protocol will now be described in further detail. In FIGS. 3a–b, the "#" symbol following a signal indicates that the signal is active low or asserted when the signal is driven low. The square and circle symbols indicate the clock in which particular signals of interest are driven and sampled. The square indicates that a signal may be driven or asserted in that clock. The circle indicates that a signal is sampled in that clock.

In FIGS. 3a–b, the primary bus clock CLK_PRI is shown at the top of the page. Immediately below the CLK_PRI signal is shown the secondary bus clock CLK_SEC. The rising edge of a clock signal is the beginning of a clock period. For example, in FIGS. 3a–b, the first rising edge of the CLK_PRI begins clock period P1 on the primary bus 40 and the first rising edge of the CLK_SEC begins clock period S1 on the secondary bus 50. It can be seen the CLK_PRI and CLK_SEC are 180° out of phase; that is S1 follows P1 by one half clock cycle, S2 follows P2 by one half clock cycle, and so on.

Referring now to FIG. 3a, it can be seen that clocking signals from one bus to the other with clock signals 180° out of phase will introduce latency of one and one half clocks into the signal. In FIG. 3a, a signal A_PRI is clocked by the primary bus clock CLK_PRI at P2. The signal is clocked into the linking logic 60 at P3 or one clock cycle later due to the latency of flip-flop 64a. This signal is then clocked by the secondary bus clock CLK_SEC onto the secondary bus 50 at S3 one half clock cycle later. Thus, clocking the signal from the primary bus 40 to the secondary bus 50 (and vice versa) introduces latency of one and one half clock cycles into a signal. It can also be seen that due to the latching of flip-flops 64a, 64b, 62a and 62b in the linking logic 60, signals provided by bus agents to one bus are "mirrored" to the other bus one and one half clock cycles later (whereas clocking the buses in phase would introduce a latency of two clock cycles).

Referring now to FIG. 3b, there is shown an example of the timing of a processor-issued read transaction to a peripheral device 80 in a computer system 10 using the present invention. Specifically, there is shown an example of the timing of a Pentium® Pro processor-issued read transaction to a peripheral device 80 over the two physically distinct Pentium® Pro processor buses 40 and 50, both of which follow a Pentium® Pro processor bus protocol which together with the linking logic 60 comprise a host bus 30. It is understood that this example is for purposes of illustration only and is not intended in any way in a limiting sense.

In FIG. 3b, a Pentium® Pro processor 20a–d may issue a read transaction 1 by asserting an address strobe (ADS_PRI#) in P1. Because the Pentium® Pro processor bus 30 is a pipelined bus, a Pentium® Pro processor 20a–d may issue a second read transaction 2 in P4, a third read transaction 3 in P7, and so on. In S2, one and one half clock cycles after P1, the address strobe ADS_SEC# is provided to the secondary bus 50 by the linking logic 60.

Pentium® Pro processor bus protocol requires that the results of the first snoop phase on the primary bus 40 be presented in P5 (i.e., 4 clock cycles after the assertion of ADS_PRI#) or alternatively that the first snoop phase be stalled at P5 (by assertion of the stall signals HIT# and HITM#) until P7. Thus, at P5, all bus agents, including the peripheral device 80, must either provide valid snoop results to the primary bus 40 or stall the first snoop phase of transaction 1. However, due to the latency in the linking logic 60, neither valid snoop results nor stall signals can be provided to the primary bus 40 by the peripheral device 80 (or the respective system controller 70a–d) in P5. Thus, in order to meet host bus protocol, the stall logic 66 (having detected the address strobe ADS_PRI# for transaction 1) asserts HIT# and HITM# on the primary bus 40 at P5 and stalls the first snoop phase of transaction 1 for another 2 clock cycles to P7. In other words, when the stall logic 66 detects the address strobe of a new transaction, the stall logic 66 provides a mandatory stall of the new transaction on the primary bus 40 in the first clock cycle in which valid snoop results or stall signals are expected.

The stall of the first snoop phase of transaction 1 on the primary bus 40 is "mirrored" to the secondary bus 50 at S6, thereby meeting Pentium® Pro processor bus protocol on the secondary bus 50 (i.e., stalling the snoop phase for transaction 1, 4 clock cycles after assertion of ADS_SEC# on the secondary bus 50).

The system controller 70a–d of the targeted peripheral device 80, while unable to provide valid snoop results or stall signals to the primary bus 40 in P5, may have information sufficient to provide valid snoop results during the time period between P5 and P7 (i.e., in time for the second or stalled snoop phase for transaction 1). If, however, these valid snoop results or stall signals were to be provided according to the protocol of the secondary bus 50 and then clocked over to the primary bus 40, yet another "mandatory" snoop stall would be required on the primary bus 40 at P7. (If protocol were to be followed on the secondary bus 50, these valid snoop results or stall signals would be presented to the secondary bus 50 by the peripheral device 80 at S8, then clocked over to the primary bus 40 at P10).

Thus, an "early snoop" or STALL_SEC# signal is defined on the system controllers 70*a*–*d*, the stall logic 66 and the primary and secondary buses 40 and 50. The STALL_SEC# signal may be a sideband signal on the Pentium® Pro processor buses; i.e., a signal that is not part of the standard Pentium® Pro processor bus protocol, but is defined and has meaning for the components of the computer system 10. The STALL_SEC# is asserted (and has the same effect as the assertion of HIT# and HITM#) if the system controllers 70*a*–*d* do not have sufficient information to provide valid snoop results at S6. The system controllers 70*a*–*d* may have sufficient information to provide valid snoop results at S6 after the requested address of the secondary bus request phase has been decoded. For example, the system controllers 70*a*–*d* may be programmed with knowledge of which peripheral devices 80 corresponding to requested addresses are capable of completing a transaction in order.

The STALL_SEC# is sampled by the stall logic 66 at S6 and provided to the primary bus 40 one half clock cycle later at P7. If STALL_SEC# is sampled asserted at S6, a third stall of the snoop phase of transaction 1 until P9 would occur at P7. If, however, as shown in FIG. 3*b*, STALL_SEC# is sampled deasserted by the stall logic 66 at S6 (meaning that the system controller 70*a*–*d* of the targeted peripheral device 80 had sufficient information to provide valid snoop results), the snoop results of the targeted peripheral device 80, although not yet presented to the secondary bus 50, will be valid and the snoop phase of transaction 1 need not be stalled any further. In this case, one and one half clock cycles later the valid snoop results are provided to the secondary bus 50 at S8.

Completion of transaction 1 may now proceed according to Pentium® Pro processor bus protocol. Because this is a read transaction, data is first provided by the peripheral device 80 to the secondary bus 50. Thus, at S10 the data phase may begin on the secondary bus 50 as indicated by assertion of the data bus busy signal DBSY_SEC#. This is followed by the data phase on the primary bus 40 one and one half clock cycles later in P12 as indicated by assertion of DBSY_PRI#.

Thus, it may be seen in FIG. 3*b* that there is a latency of 11 clocks between the request phase for transaction 1 (i.e., the assertion of ADS_PRI# in P1) and the data phase for transaction 1 (i.e., the assertion of DBSY_PRI# in P12). If STALL_SEC# is not sampled asserted, this relationship will hold true for subsequent transactions on the host bus 30. For example, the request phase for transaction 2 begins in P4 and the respective data phase begins in P16.

The assertion of ADS_PRI# in P4 and DBSY_PRI# in P16 for transaction 2 correspond to the minimum amount of clock cycles allowed under the Pentium Pro processor bus protocol between these signals and corresponding transaction 1 signals. Thus, it can be seen that following an "initial" latency of 11 clock cycles, the Pentium Pro bus 30 of the present invention is operating at full bandwidth for all subsequent transactions that are not stalled.

5.3 Remarks

By "splitting" the host bus 30 of the present invention into a primary bus 40 and a secondary bus 50 and by operating the buses 40 and 50 with the linking logic 60 as described above, the number of bus agents operably connected to the host bus 30 may be increased while clocking the host bus at a certain frequency. For example, in the Pentium® Pro embodiment, the present invention allows 8 physical loads or bus agents (4 Pentium® Pro processors 20*a*–*d* and 4 system controllers 70*a*–*d*) to be operably connected to the Pentium® Pro processor bus 30 while clocking the Pentium® Pro processor bus 30 at 100 MHz. Additionally, the present invention allows the Pentium® Pro processor bus 30 to operate at full bandwidth (i.e., 800 Mb/sec) after an initial latency between the request phase of a read transaction (i.e., the assertion of ADS_PRI#) and the data phase (i.e., the assertion of DBSY_PRI#) of 11 clock cycles.

It will be readily apparent to those skilled in the art that innumerable variations, modifications, applications, and extensions of these embodiments and principles can be made without departing from the principles and spirit of the invention. For example, the linking logic 60 may be configured in a variety of ways with a variety of conventional computer elements and devices. Accordingly, it is intended that the scope of the invention be only limited as necessitated by the accompanying claims.

What is claimed is:

1. A host bus comprising:
    (a) a primary bus receiving a primary bus clock signal and capable of being clocked at a first frequency when operably connected to a number N of bus agents;
    (b) a secondary bus receiving a secondary bus clock signal out of phase with the primary clock signal and capable of being clocked at the first frequency when connected to N bus agents; and
    (c) linking logic operably connecting the primary bus and the secondary bus such that the primary bus and secondary bus are capable of operating logically as a host bus clocked at the first frequency when connected to 2N of bus agents.

2. The host bus of claim 1 wherein the first frequency is at least approximately 100 MHz.

3. The host bus of claim 1 wherein the number N of bus agents is at least 4.

4. The host bus of claim 1 wherein the primary bus and secondary bus clock signals are approximately 180° out of phase.

5. A computer system comprising:
    (a) a plurality of requesting agents;
    (b) a plurality of target agents;
    (c) a host bus, comprising
        (1) a first bus;
        (2) a second bus;
        (3) logic for clocking signals from the first bus to the second bus and for clocking signals from the second bus to the first bus;
    wherein at least one of the plurality of requesting agents is operably connected to the first bus;
    wherein at least one of the plurality of target agents is operably connected to the second bus; and
    wherein the first and second buses are clocked at approximately the same frequency with their respective clock signals out of phase.

6. The computer system of claim 5, wherein the first and second buses are clocked at a frequency of at least approximately 100 MHz.

7. The computer system of claim 5, wherein the respective clock signals of the first and second buses are 180° out of phase.

8. The computer system of claim 5, wherein a signal clocked from the first bus to the second bus has one and one half clock cycles of latency.

9. The computer system of claim 5, wherein at least one of the requesting agents is a processor.

10. The computer system of claim 5, wherein at least one of the target agents is a PCI-based device.

11. The computer system of claim 5, wherein the logic for clocking signals comprises stall logic.

12. The computer system of claim 5, wherein the first and second buses are pipelined.

13. A computer system having a host bus executing transactions in a plurality of phases, including a snoop phase, comprising:

(a) a first bus following a protocol including an early snoop signal defined on the first bus;

(b) a second bus following the protocol, including an early snoop signal defined on the second bus;

(c) linking logic operably connecting the first and second buses such that the host bus follows the protocol and an early snoop signal may be asserted during a snoop phase.

14. The computer system of claim 13 wherein the protocol has a request phase and a data phase in addition to the snoop phase.

15. The computer system of claim 14 wherein the early snoop signal may be asserted in response to an address strobe asserted during the request phase.

16. The computer system of claim 14 wherein there is a minimum latency of 1 clock cycles between the beginning of the request phase and the beginning of the data phase for read transactions.

17. The computer system of claim 13 further comprising:

(a) at least one system controller operably connected to the second bus; and (b) at least one peripheral device operably connected to the system controller;

wherein the early snoop signal is asserted by the system controller.

18. The computer system of claim 17, wherein the early snoop signal is asserted by the system controller if the system controller determines that the snoop results of the peripheral device could not be provided according to the protocol.

19. The computer system of claim 13, wherein the early snoop signal stalls the snoop phase at least once for every transaction issued on the first bus.

20. The computer system of claim 19, wherein after an initial latency caused by a first transaction issued on the first bus, the host bus operates at full bandwidth if the early snoop signal is not asserted during subsequent transactions.

21. A computer system having a host bus, comprising:

a first bus following a protocol;

a second bus following the protocol;

a first clock signal for the first bus;

a second clock signal for the second bus, having the same frequency but out of phase with the first clock signal; and linking logic operably connecting the first and second buses to mirror onto one bus signals provided by a bus agent on the other bus.

22. The computer system of claim 21 wherein the second clock signal for the second bus is approximately 180 degrees out of phase with the first clock signal.

23. The computer system of claim 21 wherein the linking logic mirrors signals from one bus to the other with a latency of one and one half clock cycles.

* * * * *

UNITED STATES PATENT AND TRADEMARK OFFICE
CERTIFICATE OF CORRECTION

PATENT NO.   : 6,263,389 B1
DATED        : July 17, 2001
INVENTOR(S)  : Paul A. LaBerge It is certified that error appears in the above-identified patent and that said Letters Patent is hereby corrected as shown below:

<u>Column 9,</u>
Line 36, reads "1 clock cycles" should read -- 11 clock cycles --

Signed and Sealed this

Twenty-sixth Day of July, 2005

JON W. DUDAS
*Director of the United States Patent and Trademark Office*